Oct. 28, 1930.　　　　M. L. CLELAND　　　　1,779,661
LUGGAGE RACK OR SUPPORT
Filed March 8, 1930　　　2 Sheets-Sheet 1
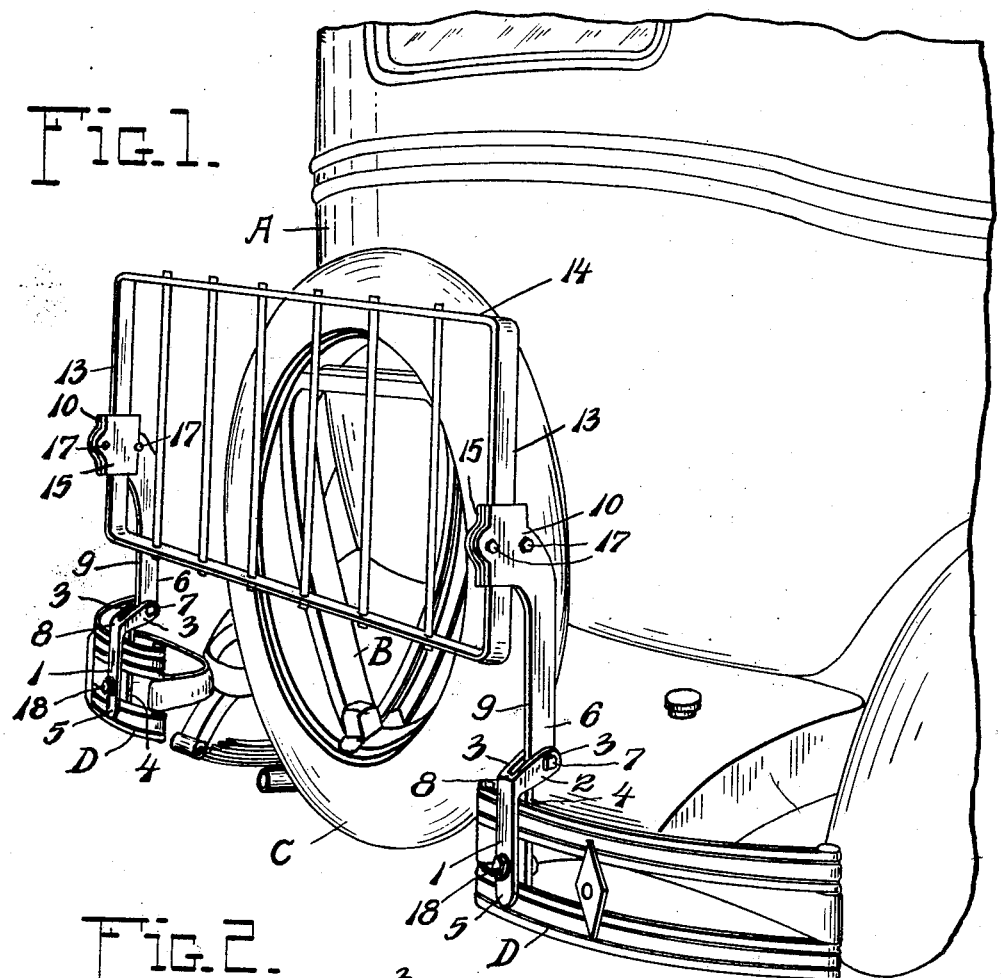
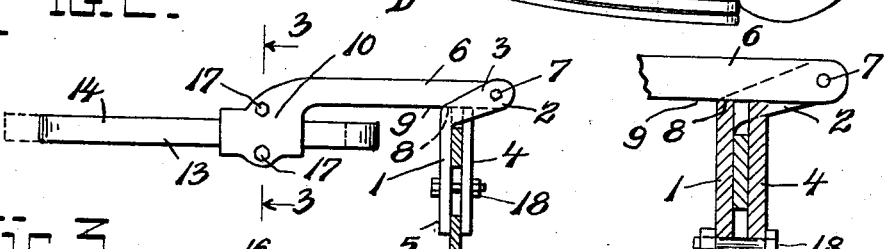
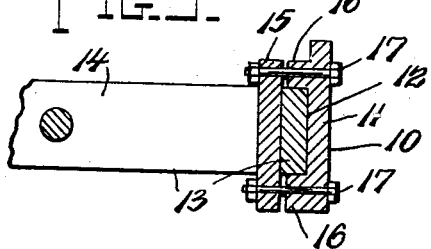
Inventor
M. L. Cleland
By Robert Robb
Attorneys Oct. 28, 1930.  M. L. CLELAND  1,779,661
LUGGAGE RACK OR SUPPORT
Filed March 8, 1930   2 Sheets-Sheet 2

Inventor
M. L. Cleland.
By Robert Robb
Attorneys

Patented Oct. 28, 1930

1,779,661

UNITED STATES PATENT OFFICE

MELVIN L. CLELAND, OF HASTINGS, NEBRASKA, ASSIGNOR TO G. A. ROTH MANUFACTURING COMPANY, OF HASTINGS, NEBRASKA, A CORPORATION OF NEBRASKA

LUGGAGE RACK OR SUPPORT

Application filed March 8, 1930. Serial No. 434,344.

This invention has to do with luggage carriers for use with automobile vehicles and is designed for attachment to the front or rear bumper of such a vehicle. In addition to the luggage carrying feature of my carrier, I construct and apply the same to the vehicle in such a manner, referring more specifically to the rear bumper, that the carrier while in use will not interfere with the expeditious removal of the tire mounted at the rear of the vehicle.

Another novel feature connected with my construction involves the utilization of brackets applicable to the opposite end portions of the rear bumper, or bumperettes as the case may be, and a rack slidably clamped in members connected to the brackets. The clamp is of such construction as to grip certain portions of the rack over a substantial area, thereby preventing the possibility of wobbling movement of the rack in said members. The clamping portion engages practically entirely around said rack portions, and this clamping connection provides for rigid adjustment of the rack in the bracket to any minute degree desired. This construction is advantageous over those heretofore in vogue, both as to the degree of adjustment possible, and the rigidity of the parts when adjusted.

Another notable feature of my invention lies in the fact that the portions connecting the rack with the bracket members are provided with offsets constituting the clamping means, said offsets extending to the rear of said connecting portions when the latter are in inoperative position. With this construction, it is evident that the luggage supporting rack, even when in inoperative position, is spaced from the spare tire a distance greater than would otherwise be the case, with the result that the tire is easily removable from its support even when the rack occupies its inoperative position.

From the above it will be apparent that whatever position the luggage rack occupies, there is sufficient freedom for insertion and removal of the spare tire without changing the adjustment of the rack.

Provision is made for the expeditious adjustment of the rack in any desired position and for the speedy attachment and removal of the brackets to and from the bumper or bumperettes.

The construction outlined above and forming the essence of my invention contains a minimum number of parts, which feature allows for simplicity of operation, low cost of production, and attachment and detachment without the employment of special tools or skilled labor.

My invention is also capable of application to the front bumper as set forth hereinabove and furthermore to the bumper support whether at the front or at the rear. In the event of the application of the luggage rack to the bumper support, an advantage is gained in that the top of the bumper itself serves to additionally support the rack when the same is in operative position, thereby relieving the bumper support of a certain amount of stress.

For a full and more complete understanding of my invention, reference may be had to the following description and accompanying drawings, in which—

Figure 1 is a fragmentary perspective view of the rear of an automobile vehicle, showing my novel luggage carrier attached thereto, and showing the relation thereof, when in inoperative position, to the spare tire attached to the vehicle.

Figure 2 is a side elevational view of the rack when in operative position, the bumper portion to which it is attached being shown in section, and the dotted lines indicating a different position of adjustment for the rack.

Figure 3 is an enlarged fragmentary sectional view taken approximately in the plane indicated by the line 3—3 in Figure 2, certain parts being shown in elevation.

Figure 4 is a fragmentary sectional view illustrating the manner of attachment of one of the carrier brackets to the bumper or bumperette, certain parts being shown in elevation.

Figure 5:
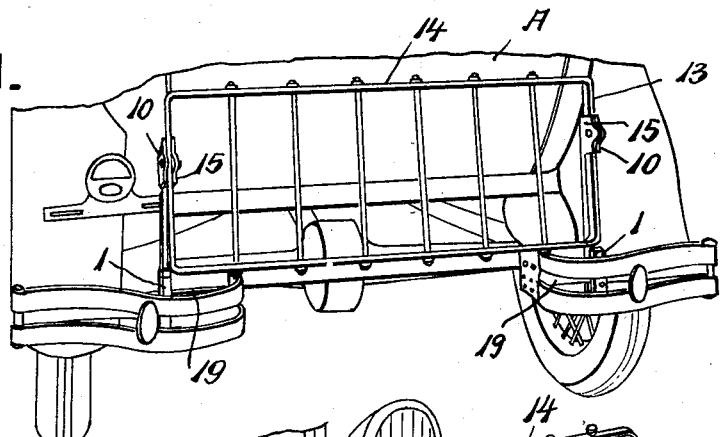
Figure 5 illustrates the same type of luggage carrier applied to the rear bumper support.
Figure 6:
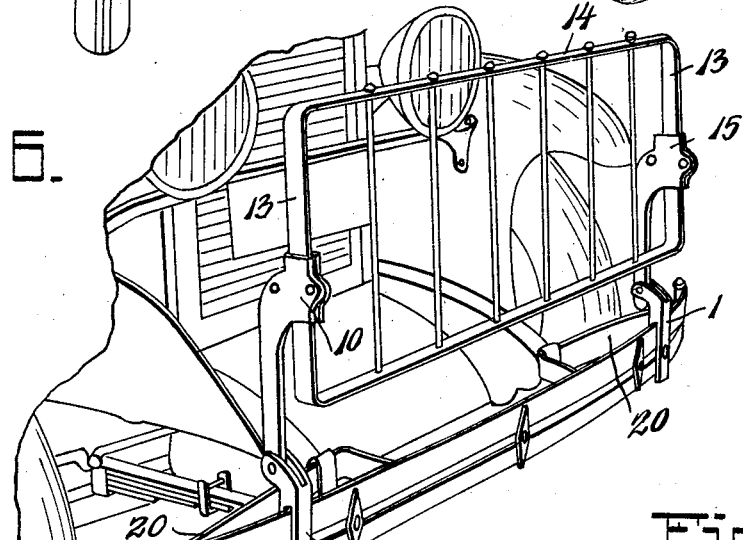
Figure 6 is a view illustrating my improved luggage rack applied to the front bumper of an automobile.

The reference character A illustrates the rear end of an automobile provided with a tire carrier B and adapted to have detachably secured thereto a spare tire C. While the rear of the automobile body may be provided with bumpers or bumperettes, I have chosen to avail myself of bumperettes D for purposes of illustration only since, as will appear as the description proceeds, my invention is applicable equally well to a complete rear bumper.

The construction embodying my invention includes a substantially L-shaped bracket member 1 having its upper offset end 2 forked to provide a pair of arms 3. A plate 4 is adapted to be disposed opposite the portion 5 of the bracket 1, said plate and portion 5 straddling the bumper D and attached thereto by any suitable means as illustrated at 18 as shown in the various figures. The arms 3 cooperate with the shank 6 of a rack supporting member to provide a forked hinge joint at 7, allowing free pivotal movement of the shank 6 and the rack supported thereby, but including bolt and nut means to tighten the parts for immovably holding the said parts against pivotal movement. The upper end of the portion 5 provides a seat 8 on which the edge portion 9 of each shank 6 is adapted to rest when said shank 6 is in a substantially horizontal position. The seats 8 thereby cooperate with the hinge joints 7 to completely support the luggage carrying rack.

Each shank 6 is provided with an offset 10 including a clamping member 11 having a channel groove 12 adapted to snugly and slidably receive the side frame 13 of the luggage carrier 14. A plate 15 is applied to the side of the frame 13 opposite that fitting in the groove 12 of the clamping member 11. It will be noted that the flanges 16 of the clamping member 11 extend from said member a distance slightly less than the thickness of the frame 13. With bolt and nut means 17 passing through the clamping member and plates 11 and 15 and straddling the frame 13, it will be apparent that, by reason of the space between the flanges 16 and the plate 15, it is possible to secure a very tight and rigid connection between the frame 13 and the clamping means. The bolt means 17 may be loosened whenever desired and the frame 13 shifted, within limits, to any degree desired, thereby providing for a minute adjustment, which at times is very desirable. It will be noted as clearly illustrated in Figure 1, that the clamping means engages the frame 13 over a very substantial area, so that lateral movement of the frame 13 within the clamping means is inhibited and a rigid connection is provided at all times.

While bolt and nut means have been illustrated as providing the clamping and connecting means in the instant disclosure, it is to be understood that any other suitable connecting means may be substituted therefor.

Figure 7:
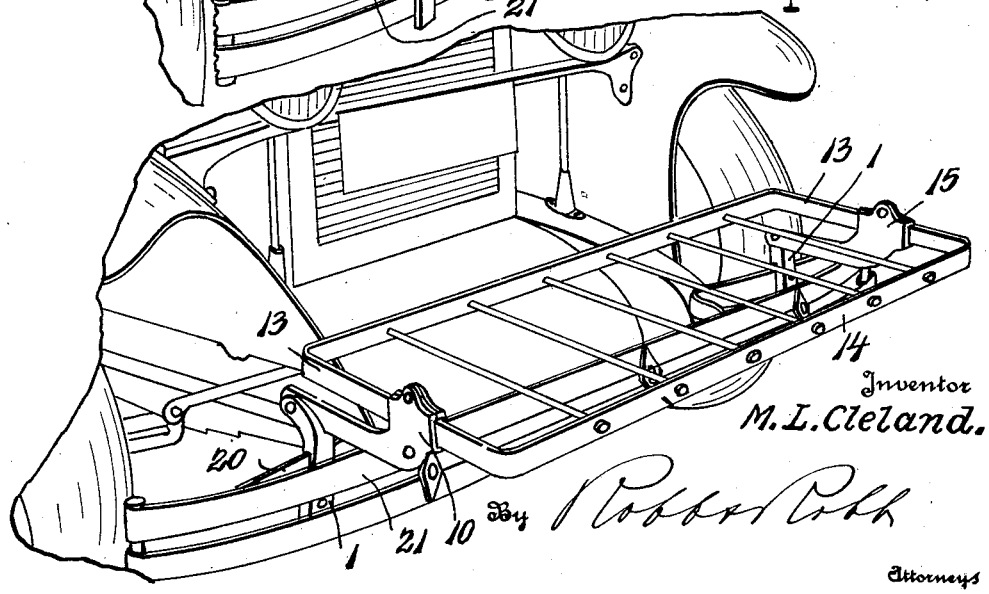
Figure 7 is a view similar to Figure 6 illustrating my improved luggage rack applied to the front bumper support in operative position.

Figures 5 and 7 illustrate my novel luggage device applied to the bumper support 19 of the rear bumper and the bumper support 20 of the front bumper, respectively. In each case the bracket is applied as heretofore outlined and as is very evident especially from Figure 7, the front bumper 21 serves to additionally support the luggage rack, to thereby relieve the bumper support of a certain amount of stress.

Having thus described my invention, what I claim as new and desire to secure by Letters Patent of the United States, is—

1. In a luggage carrier of the class described, supporting means having bifurcated portions for straddling a bumper, bracket means having pivotal connection with said supporting means, a luggage rack, said bracket means having outwardly arranged clamp portions adapted to slidably receive said luggage rack, and instrumentalities for holding said rack against movement relative to said means.

2. In a luggage carrier of the class described, a bracket adapted for attachment to a bumper, a rack having frame members, said bracket having means to slidably receive and clamp said frame members, said means including members having channels in which said frame members fit, each member having associated therewith another member adapted to cooperate therewith to receive a frame member, and instrumentalities to hold each pair of members in clamped relation to one of said frame members, the members of each pair being spaced apart when in operative position in order not to interfere with the clamping action of said instrumentalities.

In testimony whereof I affix my signature.

MELVIN L. CLELAND.